June 25, 1935.  J. MEINZINGER  2,005,869
HOT SPOT MANIFOLD
Filed March 14, 1932  2 Sheets-Sheet 2
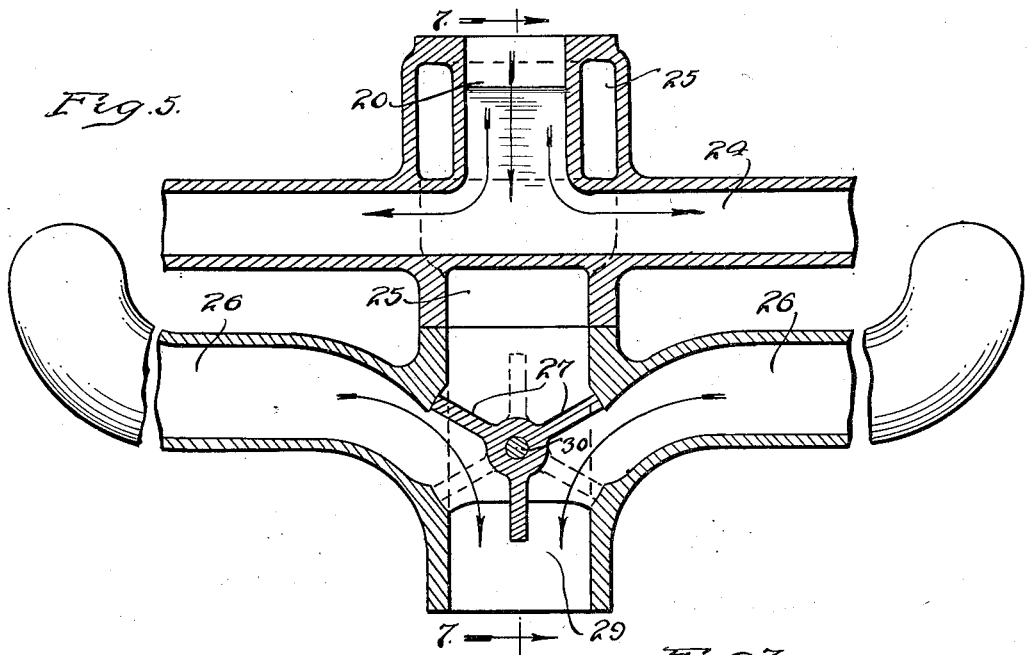
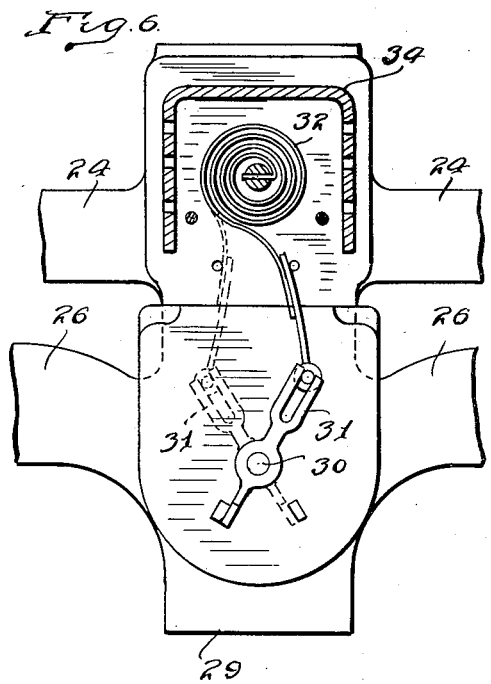
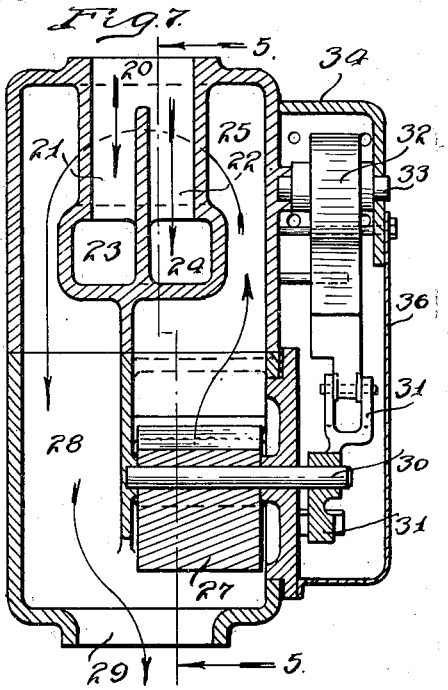
INVENTOR.
JACOB MEINZINGER
BY
ATTORNEY.

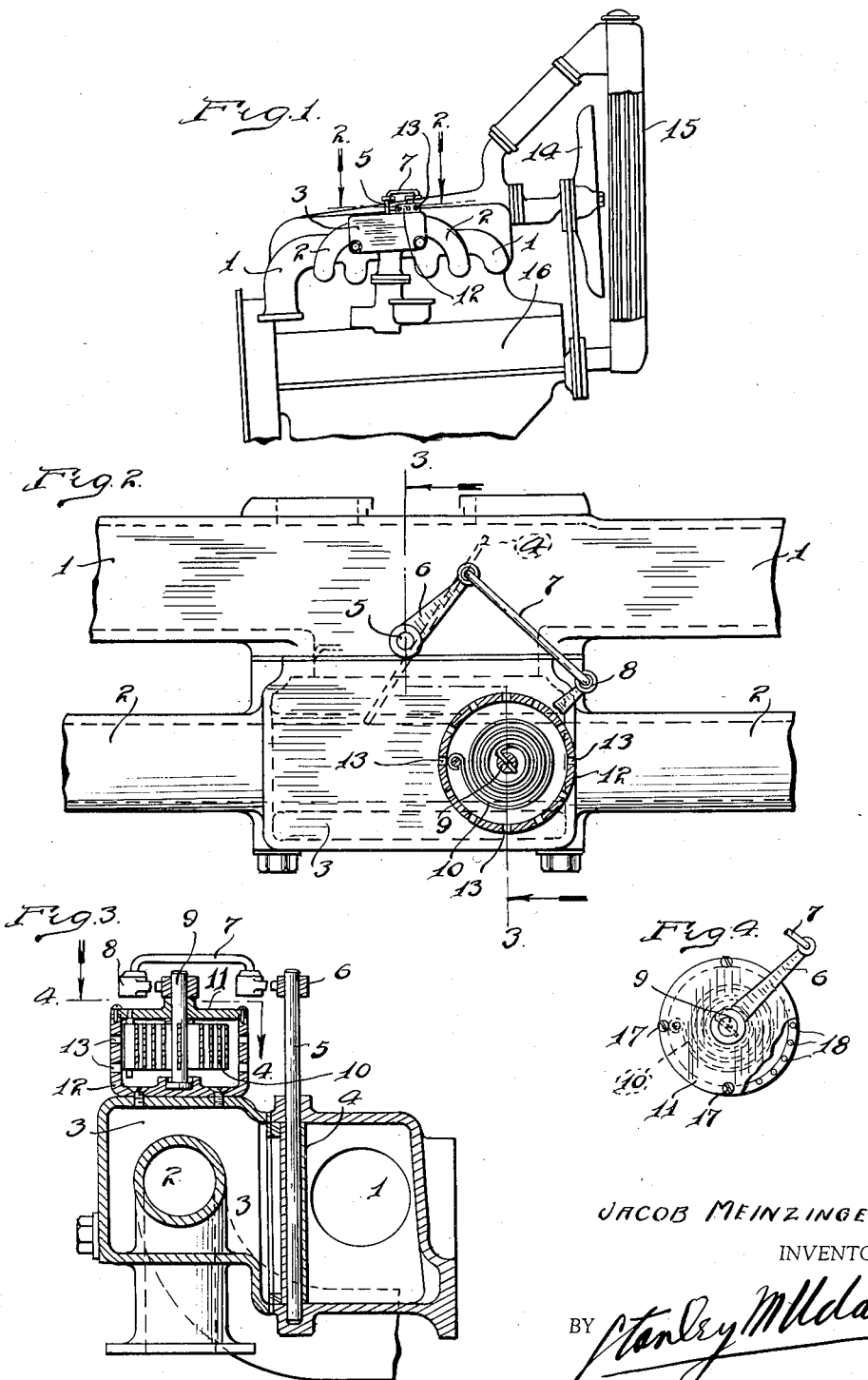

Patented June 25, 1935

2,005,869

UNITED STATES PATENT OFFICE 2,005,869

HOT SPOT MANIFOLD

Jacob Meinzinger, Detroit, Mich., assignor to George M. Holley and Earl Holley, of the Holley Carburetor Company, Detroit, Mich.

Application March 14, 1932, Serial No. 598,593

1 Claim. (Cl. 123—122)

The object of this invention is to control the mixture temperature of a carburetor installed on an automobile engine, so that when starting a car the warming-up period is reduced to the shortest possible period of time, and that the inconvenience experienced in driving during the warming up period is minimized as much as possible. It is also the object of this invention that in driving a car the heat would be re-applied whenever conditions warrant it.

The specific problem is than when running under throttle quite a considerable quantity of heat can be applied, as obviously when the throttle is closed the maximum power is not desired and therefore the chief thing that counts then is that the mixture temperature should be such that perfect distribution results. The trouble is that maximum power must be instantly available at all times.

Perfect distribution results, of course, when the mixture temperature is so high that the mixture is completely dry. If the mixture temperature is so high that the mixture is absolutely dry it is quite impossible to get maximum power. When the throttle is wide open the exhaust temperature rises and the inlet temperature has a tendency to fall. It follows, therefore, that if a thermostat is located on the inlet manifold so as to respond to inlet temperature, the following difficulties arise:

With wide open throttle when the inlet temperature falls the tendency will be for the thermostat to admit the exhaust heat in such large quantities that the power of the engine is reduced. On the other hand, when decelerating from sixty to forty miles per hour or when the mixture temperature rises, there will be a tendency to shut the heat off, although actually the heat will then be desirable rather than when the speed was higher and the mixture temperature was lower.

We thus have the paradoxical result that the thermostat is interfering with performance by applying heat when not wanted and cutting off heat when it is wanted.

If a thermostat is located on the exhaust manifold, on idling the engine the exhaust temperature gradually drops by as much as 1000° F. The heat control valve will therefore be open so as to admit heat, but at the same time the mixture temperature rises very rapidly, due to the reduction in the quantity of heat absorbing medium which is the wet fuel mixture. The net result is that the mixture temperature reaches some such absurd figure as 300° F., and as there is practically no appreciable volume of mixture to carry heat away, heat will leak down into the float chamber and there boil the gasoline and thus result in "vapor-lock" in the fuel passages.

By locating the thermostat on the exhaust jacket around the inlet manifold and arranging a valve between the jacket and exhaust in such a way that in one position it diverts the exhaust so as to direct the exhaust gases against the inlet manifold, and in the other position, cuts off communication between the exhaust manifold and the exhaust jacket, we obtain the ideal location of the thermostat, because with the thermostat so located, enough heat will leak back on closed throttle to close the valve and prevent excessive idling mixture temperature. On the other hand, a small amount of exhaust gases will be admitted at high engine speed, wide open throttle, to keep the mixture temperature above the critical low temperature at which distribution trouble becomes serious the moment the engine returns to the lower engine speeds.

The big advantage of locating the thermostat on the exhaust jacket around the inlet manifold is that when the thermostat cuts off the heat by closing the control valve it lowers the temperature in the jacket and when it opens this valve it raises the temperature in the jacket. This results in a balanced condition and the jacket temperature is under control.

By locating the thermostat in a perforated cage located in the draft from the engine fan which draws air through the engine radiator and blows it over the exhaust jacket, the temperature of the mixture is raised during the period that the radiator is being warmed up which is the period during which distribution troubles are most pronounced.

Figure 1 shows the invention applied to a conventional automobile power plant complete with a radiator and fan.

Figure 2 shows a plan view looking down on Figure 1.

Figure 3 shows a cross section on plane 33 of Figure 2.

Figure 4 shows a detail in plan view of Figs. 1, 2 and 3.

Figure 5 shows a cross sectional elevation taken on plane 55 of Figure 7 of an alternative construction.

Figure 6 shows the outside view in partial elevation of Figure 7.

Figure 7 shows a cross sectional elevation taken on plane 77 of Fig. 5.

Considering Figures 1, 2, 3 and 4:—1 is the exhaust manifold, 2 is the inlet manifold, 3 is the jacket around the inlet manifold 2, 4 is the valve between the exhaust manifold 1 and the exhaust jacket 3. This valve 4 is mounted on the shaft 5, which is connected by means of a lever 6 and a link 7 to a lever 8, which is mounted on a shaft 9. This shaft 9 is connected through a thermostat 10 with a disc 11; this disc 11 forms a cover for a chamber 12. This chamber 12 is perforated through the holes 13—13 and is mounted on the exhaust jacket 3; this perforated casing 12 is so located on the exhaust jackets as to be in the air stream from a radiator fan 14 which is driven off the engine 16 and is located immediately behind the radiator 15.

Figure 4 shows the cover 11 connected to the casing 12 by the screws 18; a plurality of holes 13 are provided so that the initial tension of the thermostat 10 can be adjusted.

In Figures 5, 6 and 7—20 is the mixture entrance to the inlet manifold which divides into two paths, 21 and 22, which branch into the inlet manifolds 23 and 24. This compound inlet manifold is provided with an exhaust jacket 25, which is connected to the exhaust manifold 26. A three cornered valve 27 controls the exhaust flow to the exhaust jacket 25, as shown in Figure 7. With the valve 27 in the position shown, the exhaust gases escape directly to the outlet 29.

When the position of valve 27 is as shown by the broken lines (Figure 5) the exhaust flows up into 25 and down by the passage 28. This valve 27 is mounted on a shaft 30, on which is mounted lever 31. This lever 31 is controlled by a thermostat 32 which is mounted on the outside of exhaust jacket 25. This thermostat 32 is mounted on the shaft 33 and is mounted inside of the perforated casing 34 which is also on the outside of the jacket 35. Casing 36 prevents dust and dirt from getting into the mechanism 31 and 32.

The shaft 33 is rigidly mounted on the outside of exhaust jacket 25, but may be adjustably mounted to correspond with the method of mounting disclosed in Figure 4.

Operation

Operation—Figures 1, 2, 3 and 4.

When starting up the engine both the manifolds 1 and 2 and the radiator 15 are cold. The thermostat 10 responding to this condition turns the heat on full—that is, the valve 4 directs all the available exhaust gas against the inlet manifold 2. As the jacket 3 warms up quickly there is a tendency for the heat supply to be reduced, but as cold air continues to blow over the thermostat 10 to a limited degree as determined by the size and number of the perforations 13, the movement of the valve 4 in response to the increase in the temperature of the jacket 3 is delayed.

When the radiator 15 is warm and warm air is blowing over thermostat 10, the heat supply to the jacket 3 is reduced and finally as the temperature increases is completely cut off.

The operation of the manifold shown in Figures 5, 6 and 7 is similar, except that the valve 27 only controls the admission of exhaust to the jacket 25 and does not cut off all communication between the jacket and the exhaust manifold, as is the case in the construction shown in Figures 1, 2, 3, and 4. Although obviously some exhaust heat will be available due to the pulsation of exhaust in 25, the distance is so great that only a relatively small quantity of heat will leak back into the inlet manifold when the thermostat rotates the valve 27 into the position shown by full lines.

What I claim is:

In an exhaust jacketed inlet manifold of the type described, an internal combustion engine associated therewith having an exhaust manifold, a cooling radiator and a cooling fan therefor, a valve means for controlling the flow of exhaust gases from the exhaust manifold through the exhaust jacket of the inlet manifold, thermostatic means mounted entirely upon the outside of said exhaust jacket remote from said valve and in the air stream from said cooling fan means interconnecting said thermostatic means and said valve means.

JACOB MEINZINGER.